Sept. 6, 1949.  A. C. PETERSON  2,481,149
AIR CONDITIONING AND HEATING MEANS
Filed April 17, 1945  3 Sheets-Sheet 1

Inventor
Adolphe Peterson

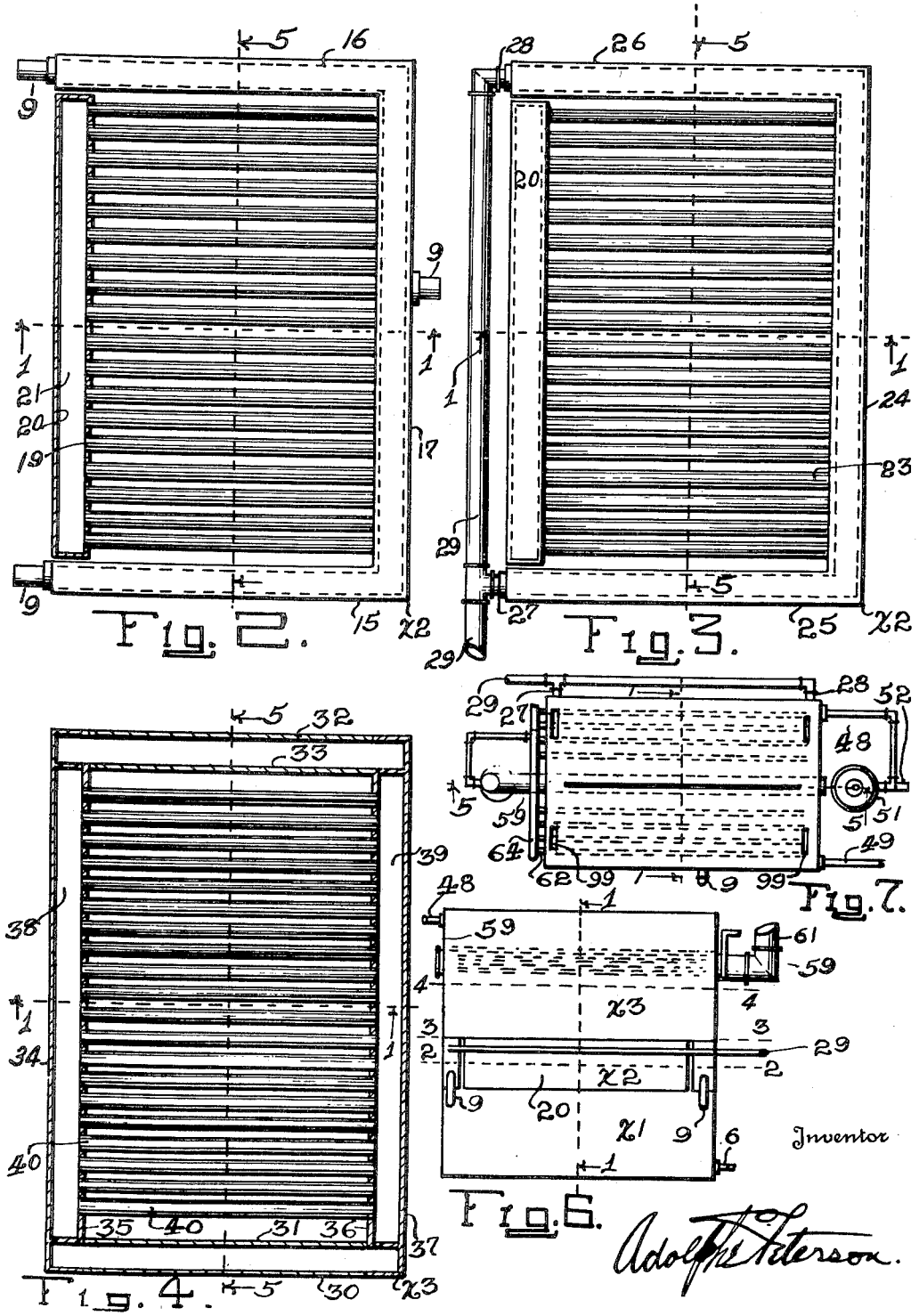

Sept. 6, 1949.  A. C. PETERSON  2,481,149
AIR CONDITIONING AND HEATING MEANS
Filed April 17, 1945  3 Sheets-Sheet 3

Inventor
Adolph Peterson

Patented Sept. 6, 1949

2,481,149

UNITED STATES PATENT OFFICE 2,481,149

AIR-CONDITIONING AND HEATING MEANS

Adolphe C. Peterson, Minneapolis, Minn.

Application April 17, 1945, Serial No. 588,744

13 Claims. (Cl. 257—3)

My invention relates to air conditioning means and heating means in association with other elements for air conditioning and is therefore called "Air conditioning and heating means."

The principal objects of my invention are to provide an apparatus for air conditioning and heating, which means shall be simple in construction, relatively small in size for accomplishing its functions, and which in relation to its abilities shall be relatively cheap in manufacture. An object is to provide in connection with the use for heating and air conditioning, a form of construction of the heat transfer elements which facilitates construction and assembly, in relation to the heat transfer surface which is obtained in the construction. An object is to provide a heat transfer means for houses and buildings generally, which means shall by reason of the novel form and assembly of the elements for heat transfer, provide a very large heat transfer surface, in proportion to the overall size of the heat transfer unit. An object is to provide economy in use of fuel for heating, by reason of the proportionately large surface for heat transfer and also the dual system of heating provided. An object is also to provide an efficient cooling means for use in hot seasons, by reason of the large heat transfer surface provided, and also by reason of the dual system of cooling provided. An object is to provide for cooling in hot seasons a heat transfer means which functions as such heat transfer means both in summer for cooling and in winter for heating. An object is to provide for summer cooling of buildings a system which by reason of the novel means of cooling for air conditioning provides a relatively simple and cheaply constructed means for the purpose of cooling. An object is to provide such a dual system for dual objects of heating and cooling, which means will be available for heating or cooling simply by the opening or closing of switches and valves. In general the object is to provide improved automatic heating and cooling means and ventilation in connection.

The principal devices and combinations of devices, comprising my invention, are as hereinafter described and as claimed in the claims. In the accompanying drawings which illustrate my invention, like characters refer to like parts throughout the several views.

Referring to the drawings:

Figure 2 is a horizontal transverse section through the principal parts on the lines 2—2 of Figures 1, 5, and 6, some parts below that line of vision being shown in plan view, this view being on a scale approximately one-half that of Figure 1.

Figure 3 is a horizontal transverse section through the principal parts on the lines 3—3 of Figures 1, 5, 6, some parts below that line of vision being shown in plan view, this view being on a scale approximately one-half that of Figure 1.

Figure 4 is a horizontal transverse section through the principal parts on the lines 4—4 of Figures 1, 5, 6, some parts below that line being shown in plan view, this view being on a scale which is approximately one-half that of Figure 1.

Figure 6 is a side elevation on a reduced scale looking from the rear of the figure as shown in Figure 5, this scale being very much less than the others, approximately one fourth that of Figure 1.

Figure 7 is a plan view on a reduced scale, approximately one-fourth that of Figure 1.

Figure 8:
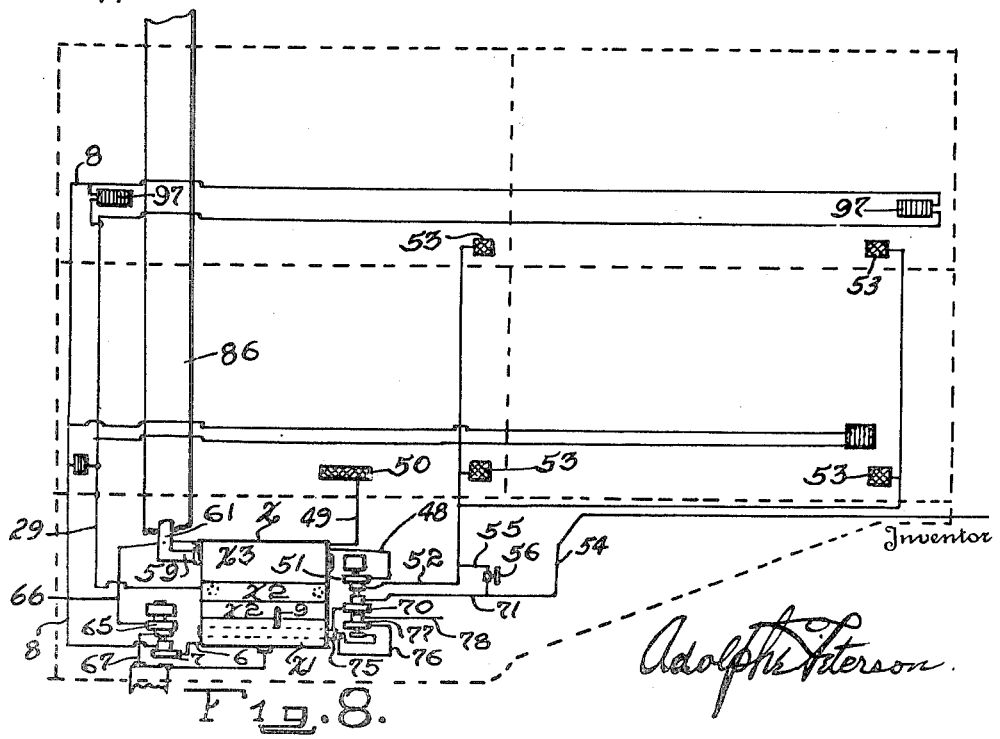
Figure 8 is a diagrammatic sketch to show the application of my device in a house heating and cooling system, the house section lines being illustrated by the dotted lines of Figure 8, to show its rooms.

Referring first to all the figures with exception of Figure 8, the device embodies chiefly a sectionally built and assembled heat transfer unit which provides for heat transfer from or to two mediums for carriages of the heat, air of the house and liquid for radiators. This one heat transfer unit is both the heat supply means for the house and is also the cooling or heat abstraction means for the house, the former to be the operation in winter and the latter to be the operation in the hot days of the summer, whenever it is desired for cooling, of the house air.

The heat transfer unit is generally denoted X in the drawings, and it embodies generally a bottom section X1, a middle section X2 and an upper section X3. These three sections may be separately manufactured and assembled either in the shop or on the site where it is to be used. Each section is made of a metal preferably a metallic alloy or such a metal as rust resisting steel or copper, and either section may be made of that metal or alloy which is most suitable for it.

Figures 1, 9:
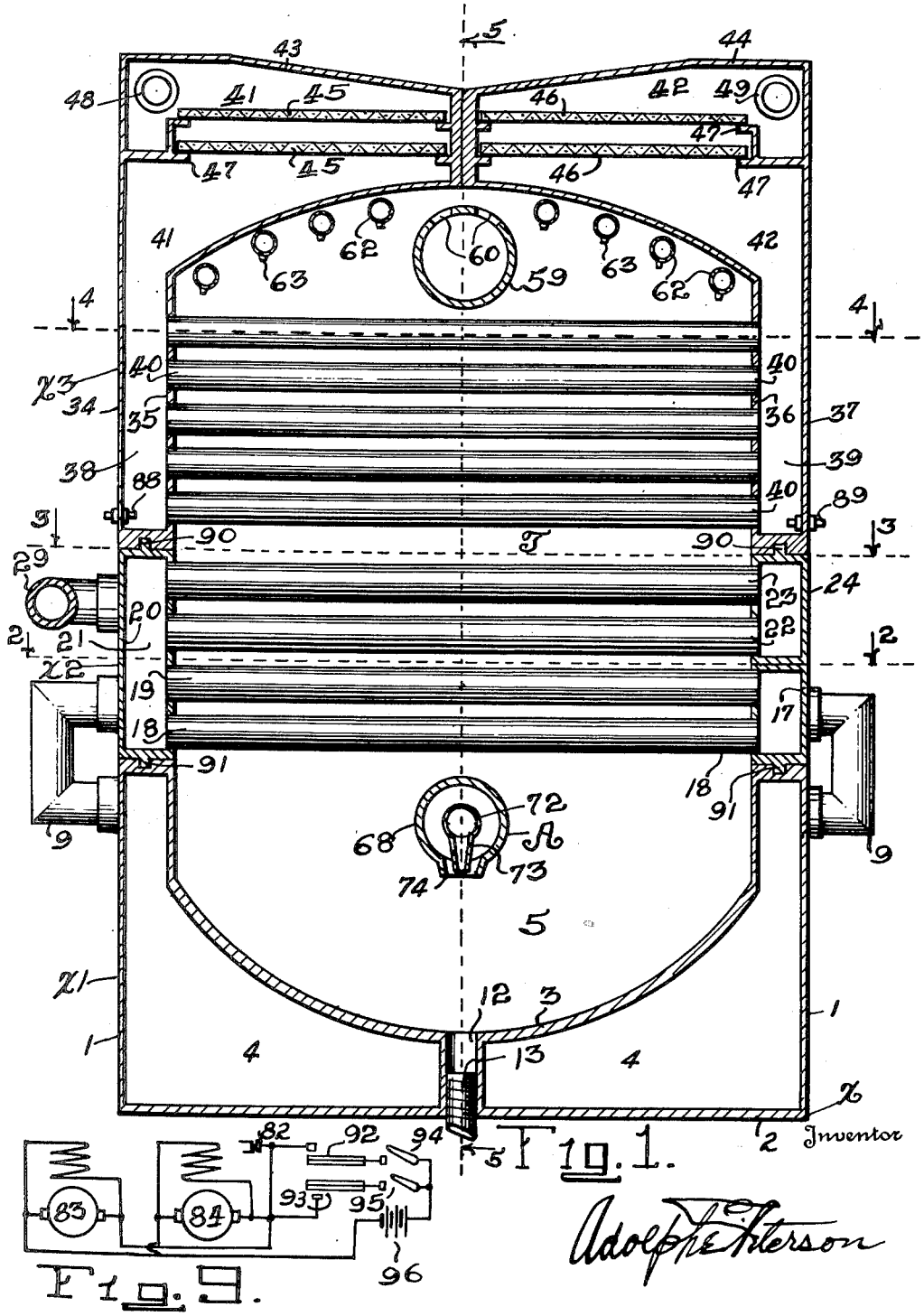
Figure 1 is a view chiefly in vertical transverse section through the principal parts of my device, some of the elements being shown in side elevation, and some broken away, this section being taken on the lines 1—1 of Figures 2, 3, 4, 5, 6, 7.
Fig. 9 is a diagrammatic sketch showing the electric control circuit.
Figure 5:
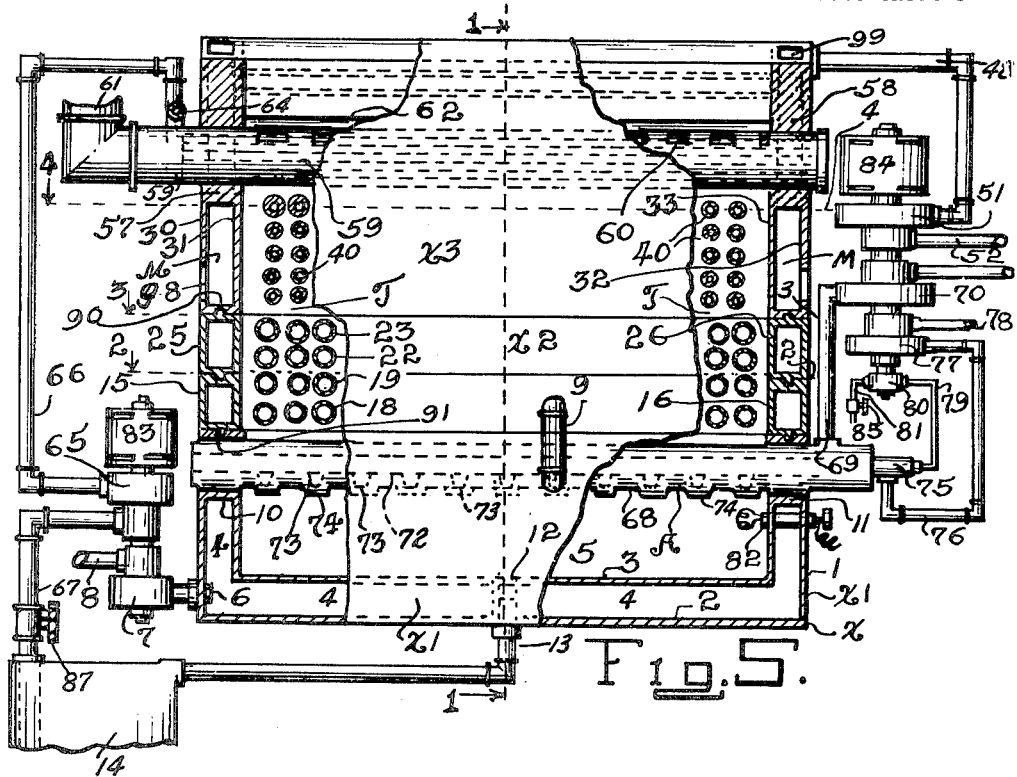
Figure 5 is a vertical transverse section through the principal parts on the lines 5—5 of Figures 1, 2, 3, 4, and 7, some parts being shown in full side elevation, this section being on a scale which is approximately one-half that of Figure 1.

The bottom section X1, seen chiefly in Figures 1, 5, 6, is generally rectangular in plan, and forms by its side walls 1, bottom wall 2 and depressed concave upper wall 3, a complete enclosure for a water heating space 4 which is below the firechamber 5 formed above the wall 3. This water heating space 4 receives water by way of pipe 6 from a centrifugal pump 7, and the latter receives the radiator water by way of the pipe 8, and the water heating space 4 delivers water as it is heated or cooled by way of the three connecting pipes each denoted 9, to the intermediate section X2. The bottom section X1 has formed in each of its opposite ends cylindrical members 10 and 11, respectively, wherein may be placed a unit generally denoted A which is both a fuel and air delivering member for winter use and an air delivering member for summer cooling, and is hereinafter described in detail. The bottom section X1 has formed in the central part immediately under the fire chamber 5 an outlet port 12 in which is placed the end of a pipe 13 through which water may be discharged to a water reservoir 14 or any drain in lieu thereof, when the device is operated for cooling.

The intermediate section X2 is generally rectangular in plan and generally speaking has two levels forming it and each of the latter has two levels of heat transfer tubes. The lower level or part may be seen in Figure 2 and the upper level or part in Figure 3. This section X2 has two end conduits 15 and 16, Fig. 2, which are each rectangular in vertical cross section, as seen in Fig. 5, and they are formed with a similar cross sectioned conduit 17, seen in Fig. 1, and the conduit 17 has welded or otherwise secured in its side wall, the two levels of water tubes 18 and 19, Fig. 1, 19 in Fig. 2, and these two sets or levels of tubes cross the interior space of the heat transfer unit just above the fire chamber 5 and pass the water from conduit 17 to a header conduit 20, Figure 2 and Fig. 1, and. Fig. 3. This header conduit 20 is of about the same horizontal interior width as the conduits 15, 16, 17, but it is approximately twice as high interiorly and exteriorly so that the water chamber 21 therein, may receive water from all the tubes 18 and 19 and pass this water upwardly to the adjacent ends of the two levels or sets of water tubes 22 and 23, respectively, these tubes being welded into header conduit 20. These tubes 22 and 23 pass horizontally and transversely across the interior heat transfer space of the unit immediately above the tubes 19, and at their opposite ends they all are welded into the conduit 24, which is formed with and delivers into the two side conduits 25 and 26, so that water passing upwardly in header chamber 20 and through tubes 22 and 23 will pass through conduit 24 as a collector and thence in two divided streams into the two side conduits 25 and 26, and thereby into the two branches 27, 28 to common conduit 29 which is the house hot-water main. It will be seen in Figure 2 that conduits 15, 16, 17, form a U in plan view, with the tubes 18, 19 inside the U, and that the conduits 24, 25, 26, likewise form a U, seen in Figure 3 with the tubes 22 and 23 inside the U. The three pipes 9 deliver from the bottom section X1 to the conduits 15, 16, at their ends, and the conduit 17, and all this water from pipes 9 collects in conduit 17 and passes thence into the two tube levels 18, 19.

The top section, X3, may be formed as one section, or may as desired be formed in more sections joined in any way to form the section shown. The section X3 is generally of an inverted boxlike form formed by vertical walls 30, 31 at one end, these two walls being parallel and spaced apart just a few inches say three or four, (depending on the heating capacity of the unit), vertical walls 32, 33, parallel and spaced apart two or three inches and located at the other end of section X3, and two parallel walls 34, 35 at one side, and 36, 37, at the other side, two of these walls curving over the top of the interior heat transfer unit space. There are thus formed air header chamber 38 at one side, Fig. 1, Fig. 4, and air header chamber 39, at the other side, Fig. 1, Fig. 4, and air tubes 40 are welded into the interior walls of the two air header chambers 38, 39, crossing the interior space of the heat transfer unit X, immediately above the upper set of water tubes of section X2. These air tubes 40 are shown as lying in four levels of tubes, each containing a number of tubes horizontally placed and crossing the heating space (or cooling space). The air header chamber 38 is joined with an overhead air cleaner or filtering space 41 and the air header chamber 39 is in a similar manner joined with an overhead air cleaner or filtering space 42, these last named spaces being formed in the upper structure of section X3, and located immediately above the interior heating space of the unit X, and separated from the latter by the curved parts of the walls 35, 36. These air filtering spaces 41, 42 are covered by the walls 43, 44, which may be formed with the walls of section X3 or separately formed and joined thereto as shown by bolts or otherwise, preferably in such manner as will facilitate removal of the filters, although they may not be so shown.

The air filtering spaces 41, 42, have in them, horizontally placed, air filters, such as are commonly used, of glass or other material, these filters 45, 46, respectively, being placed on supporting elements 47. The filters are sufficiently porous to pass air through them between the upper and lower sections of the air filtering spaces 41, 42, and one of the latter receives house or fresh air from a pipe 48 and the other discharges this air as heated or cooled air by way of the house air main 49, delivering to one or more warm (or cold) air registers 50 located in the upper rooms of the house. The pipe 48 receives house or fresh air or a mixture thereof, from a centrifugal air blower 51, and the latter receives the house air or fresh air from house returning air main 52 from registers 53 located in upper rooms of the house, or may receive part or all of the air by way of a fresh air pipe 54 the inlet of which is located in atmospheric air outside the house, when the connecting pipe 55, is opened by hand valve 56, and depending on whether the return air registers 53 are open or closed as they may be by any closing means (not shown in the drawings).

The section X3 has formed in its two opposite end walls bored members 57, 58, respectively wherein is placed and rests, a horizontal, transversely located smoke or discharge air pipe, this pipe, 59, passing transversely across the interior heating or cooling space immediately above the air tubes 40, and it has on its upper side a considerable number of air receiving ports 60 by way of which air from the interior heating space of the unit, or smoke, passes into the pipe 59, and by way of pipe 59 to any vertical pipe 61 being or passing into a chimney to outside air. This pipe 59 is a discharge pipe for the products of combustion in use as a heater or the air as a bearer of evaporated water in use as a cooling unit. In the interior space of the unit X, immediately above the air tubes 40, and adjacent to and about on the same level with and parallel to the pipe 59, there are located a number of parallel, spaced, cooling water tubes 62, each of which has a number of water spray nozzles 63 and each of which receives cooling water from the cooling water manifold 64 which is located outside of the section X3 as shown in Fig. 7, the latter receiving the cooling water from a centrifugal or gear or other type water pump 65 by way of pipe 66, the pump 65, receiving water by way of pipe 67, from the reservoir 14 or any cold water supply main or artesian well or other supply means, Figures 5 and 8. I state that the water supply for the cooling may be either from a reservoir which receives the returned water or from an artesian well or other supply means, since the means, may utilize only one or two methods of cooling as hereafter described.

Referring now again to the unit A which is a fuel and air delivering member, which may deliver only air in summer cooling use, the member A is formed chiefly by a rather large diameter conduit 68 which is closed at one end, and receives its main supply of air at the other end by way of the air pipe 69 from the centrifugal or other type blower 70, which latter receives air from pipe 71 and thereby either from the house interior or from the outside atmospheric air, as shown in Figure 8. The conduit 68 has interiorly thereof a fuel tube 72 which is approximately of the same length as conduit 68, and delivers by way of a member of individual nozzles 73 all pointing downwardly and each pointing into an air nozzle 74 which delivers air from the interior space of conduit 68 and downwardly into the fire chamber 5, and with it delivers admixed fuel, if fuel is being delivered to fuel tube 72, as hereafter described, this fuel delivery being cut off in use of the unit as a cooling unit in summertime.

The fuel tube 72 in heating use, receives fuel, either gas or liquid, mixed with air from a mixing tube 75, in which air and fuel are mixed, the air being received by pipe 76 from a centrifugal blower or other type blower 77 which receives air by pipe 78, and the fuel being received as gas or liquid, by pipe 79 from the small centrifugal or rotary or other type fuel pump 80, which may receive either gas or liquid fuel as oil, from pipe 81, Figure 5. (Fuel gas may be supplied by any other controlled delivery means such as are commonly used.) A spark plug or other ignition means 82 is placed in fire chamber 5 to ignite the air and fuel mixture when supplied, as shown in Figure 5.

The two water pumps, 65 and 7, are driven in unison by means of the electric motor 83. The three air pumps, 51, 70, and 77, are driven in unison by means of the electric motor 84. The water flow from pump 65 may be cut off by means of hand valve 87. The fuel flow may be cut off by means of the hand valve 85, or any other means. The various pumps, air and water and fuel, will be proportioned to properly supply a requisite quantity, in the case of any one of them. The pipe 61 delivers into the chimney 86. The air blowers are preferably so proportioned, as to provide that the blower moving the house air will draw fresh air from outside air when the hand valve 56 is opened. The air pipe 78 may draw stale air from the house in any manner.

Short pipes 88 and 89 are placed in the wall of the lower part of the air header chambers 38 and 39, respectively, to provide for drainage of any condensation which might collect in the said chambers from vapor carried by air passing through the chambers. In Figures 1 and 5 it will be seen that there are ridges or tongues 90 on the upper surfaces and 91 on the lower surfaces of the metal of the conduits forming the intermediate section X2 and that these ridges in assembling enter into grooves formed in the adjacent metal of the adjoining sections X3 and X1, so that the sections are thereby held firmly in place when they are placed in their positions as shown in the figures X1, X2, X3, from bottom to top. Any cement which will withstand heat may be placed between the parts to aid in assembling and holding the sections together and preventing leakage in the final assembly. It is to be noted however that any means for holding the sections together, such as bolts and flanges may be used, if that be desired, or the sections may even be welded together in the positions, as shown.

Referring to Figure 9, which shows the control circuit, or one form thereof which may be used, with my device, there are shown two thermostats, a winter thermostat 92 and a summer thermostat 93, the former placed in circuit by hand switch 94 and the latter by hand switch 95. When the winter thermostat 92 is in circuit, the ignition element 82 is also in circuit and provides for ignition. This ignition element may be an incandescent element or any sparking means, in the latter event the usual means for providing sparking will be included, this not being shown, as such means are commonly used. The motors 83 and 84 will each be in circuit to be driven for both winter and summer circuits. No ignition means is provided for the summer circuit. Current may be provided by battery 96 or any main line supply means. The house radiator water main 29 delivers water to any or all of the radiators 97 and the return water pipe 8 returns water from the radiators to the pump 7 which under both winter and summer operation induces a flow of water through the system including the radiators 97 and the water tubes 18, 19, 22, 23 of the intermediate section X2, for heating in winter or cooling in summer. The winter thermostat 92 is adjusted to provide for closing of the circuit through the motors 84, 83 and ignition means 82, when the temperature in the rooms of the house is less than 72 degrees or the predetermined winter temperature to be maintained. The summer thermostat 93 is adjusted to provide for closing of the circuit through the motors 84, 83, whenever the temperature of the rooms to be cooled is over say 85 degrees or such other temperature as may be determined to be the temperature to be maintained in the rooms in the hot days of the summer. In the summer period the winter thermostat 92 is cut out of the circuit, and vice versa in the summer time.

The operation for winter use is now described. The hand switch 94 is closed and the switch 95 is opened and pipe 81 delivers fuel from any oil or gas supply means or any other fuel such as a mixture of pulverized coal with oil. The valve 87 is closed and maintained closed throughout the winter, and there is therefore no movement of water by pump 65 from reservoir 14 or the water supply which may be an artesian well supplying cold water, and thus no water is delivered to pipe 66 and thereby to manifold 64, pipes 62, nozzles 63, for discharge as spray in the interior heating space of the unit.

Whenever the thermostat 92 closes the circuit, in winter time, the motors 84 and 83 will each be operated at a predetermined speed, proportioned for proper results, and when they are so operated, the blowers 51, 70, 77 will each operate to move air through their associated means, the fuel pump 80 will deliver fuel to the mixing chamber 75; and at the same time the pump 7 will circulate water in a circuit comprising radiators 97, and water heating pipes 18, 19, 22, 23. Air from blower 77 will aid in spraying fuel or mixing fuel in mixing chamber 75 and from this chamber the mixture will flow into tube 72 from whence it will issue as an overrich mixture through nozzles 73 serving there to draw air from the space intermediately of tube 72 and tube 68 to inject that air with it through nozzles 74 to fire chamber 5 where the air and fuel will be ignited by ignition element 82 and burn in fire chamber 5 in a flame directed downwardly against the upper surface of curved wall 3 of the section X1. The combustion gases will then flow outwardly against inner surfaces of the side walls of fire chamber 5 and then upwardly between pipes 18, 19, 22, 23 of section X2, then further upwardly between pipes 40 of section X3 and then along inner surface of metal above the heating space, to ports 60, entering pipe 59, from thence to pipe 61, and thereby to chimney 86. The air in space between tube 72 and tube 68 is delivered by blower 70, and this air is preferably at a somewhat lesser pressure than air from blower 77. It may be noted here that blower 77 may be omitted from the construction in the event that a gaseous fuel delivered under pressure is used, the gas supply means then may include any gas supply control means associated with the control means in any well known manner, or the pump 80 may then be a quantity controlling pump means such as a Roots blower or vane pump.

As the heat is supplied by the combustion the blower 51 will deliver house air or fresh air mixed therewith to pipe 48 and thereby through air chamber 41 and its filters 45 to header chamber 38 and thereby to pipes 40 and through them to header chamber 39 and to space 42 through filters 46 to pipe 49 and thereby to the house hot air register 50 or any such registers.

Referring now to the summer operation for cooling of the house interior, the hand switch 95 is closed for this operation, and the switch 94 is opened. The fuel supply is stopped by closing the valve 85, so that the pump 80 will then be inoperative to deliver fuel to chamber 75. The valve 87 is now opened and maintained open for summer operation, so that in this operation, whenever the motors 84, 83 operate under the control of thermostat 93, when temperature is excessive, water will be delivered continuously by pump 65 to pipe 66 to manifold 64, pipes 62 and nozzles 63, so that in operation water will issue as a spray from the large number of spray nozzles 63 and descend as a spray or fine mist to the pipes 40 and further downwardly to the pipes 23, 22, 19, 18, and unevaporated water will collect in the bottom of the fire chamber 5 and pass through port 12 to pipe 13 and thereby either back to reservoir 14 or to a drain pipe, not shown. As the water spray and mist descends some of the water will be deposited on and collect on the pipes 40, 23, 22, 19, 18, for evaporation. Coincidentally with the circulating of water or delivering of water to spray nozzles 63, the air pumps 51, 70 and 77 will operate as in the case of heating, and the pump 7 will circulate the radiator system water between the radiators 97 and the space 4, pipes 18, and 19, 22, and 23, this will result in constant circulation of the water of the radiator system for abstraction of heat in pipes 18, 19 and space 4; and coincidentally circulation of air or movement of house air and fresh air through pump 51, to pipe 48, air chambers 41 and filters 45, header chamber 38, pipes 40, header chamber 39, space 42, through filters 46 to pipe 49 and thereby to the house registers 50 or any number thereof; and coincidentally delivery of air by blowers 70 and 77, to tubes 72, and 68 for discharge through nozzles 74 to the space in fire chamber 5, where the air will circulate and pass upwardly, passing pipes 18, 19, 22, 23, and then pipes 40, and be ejected through ports 60 to pipe 59 and pipe 61 and chimney 86.

The movement of the air delivered by blowers 70 and 77 through the interior transfer space of the unit, passing the heat transfer pipes, will result in evaporation of water from the spray or mist falling in the interior transfer space which may be denoted T, and may be called a heat transfer space for winter use and a cold transfer space for summer use; and will result also in evaporation of water from the outer surface of the pipes 18, 19, 22, 23, 40, water being deposited thereon as a spray continuously. The evaporation of water in the space T and from the water on the pipes, will result in abstraction of heat from the air in the space T and from the liquid or air in the pipes 18, 19, 22, 23, 40, and thereby the temperature of the radiator system water, and the circulating house air is lowered. This lowering of temperatures may be as much as ten to twenty or even thirty degrees, depending on the temperature of the air to be cooled, and the proportions of the system, the quantity of air delivered by blowers 70 and 77 for evaporation of water, and likewise the speed of circulation of the radiator system water and the house air. It should be noted here that the pipe 67 may be a pipe delivering water from an artesian well supply either directly or from any artesian well pumping system supply, and this would result in a delivery of cold water to the evaporation system which would perhaps somewhat reduce the quantity of evaporation but at the same time would increase the direct effect of cooling resulting from the colder temperature of the water delivered for evaporation. Preferably the water supply for evaporation would be an artesian well supply which would be cold water, and this would speed the cooling effect and diminish the relative length of cooling operation per day and reduce operating cost. However I intend that preferably the system for cooling would depend on both the evaporative effect for cooling, and the lower temperature of water generally used for its cooling effect. But I contemplate that my system may be used without the delivery of air for evaporative effect in summertime by blowers 70 and 71, if a very cold water supply is available for cooling effect, and provision may then be made for cutting out blowers 70, 71 for summer use, relying on the cooling effect of delivery of cold water by pump 65 to nozzles 63 to the exterior surface of the heat transfer pipes. Any means may be provided, but is not shown, for varying the proportionate delivery of air through the various air conducting means, for winter and summer operation, it being contemplated that either proportioning of the pumping means and conduits may be relied on for this or any control means such as valves or any other means, may be provided.

In either operation the house air passes through pipes 40 for heat abstraction. In either operation, for heat absorption or abstraction, the water of the radiator system passes from pump 7, to space 4, thence through pipes 9, directly to conduit 17 and by way of conduits 15, 16 to conduit 17, and by conduit 17, to pipes 18, 19, thence to header chamber 21, thence to pipes 22, 23, thence to conduit 24, thence to conduits 25, 26; thence to pipe 29 and thereby back to the radiators 97 for either heating or cooling effect in the radiator on the surrounding air of the rooms, and back for recirculation in the system. While I have shown my combined heating and cooling system for use with both a water radiator system and an air circulation system, I contemplate that the dual heating and cooling system may be used with either the circulating radiator water system or the circulating house air system, and without the other of the latter systems.

I contemplate that my novel construction embodying the section X2 with its U shaped conduits 15, 16, 17, and interiorly placed pipes 18, 19, and U shaped conduits 24, 25, 26 with its interiorly placed pipes 22, 23, which provides a readily constructed and assembled heater construction, providing large heat transfer capacity, may be used with either a heating system or a cooling system and without the other of the latter systems, or may be used for any heat transfer means, to provide such heat transfer capacity in a readily constructed and cheaply constructed means.

In Figure 5 are shown chambers M each of which has an air entry port 98 and an air discharge port 99, these chambers thereby providing for basement heating if that be desired. Any number of sections X2 may be used in a construction, for any heat transfer purpose such as described or another purpose, the construction facilitating a building up of capacity by use of any number.

It will be noted that the form of the U-shaped conduits plus the header chamber of the section X2 provides for a mounting of the tubes in sections each of which has its surrounding supporting and embracing conduits like the conduits 15, 16, 17 and 24, 25, 26, and thus the section is a self supporting and enclosing heat transfer section.

The tubes 62 and nozzles 63 should be made of a high heat resisting steel, which is rust resisting as well, and they will thereby resist the heat of the heating season, even though they do not then carry water. But it is contemplated that the tubes 62 may be protected by any means against the heat of the heating season combustion in fire chamber 5, the nozzles 63 in that case remaining exposed, and the latter being made of a high heat resistant steel or metal, or in lieu thereof, any means may be used for additionally protecting them in the heating season.

While I have shown particular devices and combinations of devices in the illustration of my invention, I contemplate that other detailed devices and combinations of devices, may be used in the realization of my invention, without departing from the spirit and intention thereof. While I have shown the novel U-shaped section X2 as a part of a house heating and cooling means, this section may be in other combinations as for instance steam generator combinations, super-heater combinations, air-preheater combinations, and the like.

What I claim is:

1. A heat transfer means for air conditioning of interior building space, comprising, an enclosed space, a conduit means having surfaces exposed to said enclosed space and forming part of a heat conveying fluid system for heating or cooling of said interior building space, air motive means for supplying air to said enclosed space, fuel supply means delivering to said enclosed space, a cooling water supply delivering to said enclosed space, thermostatic means exposed to air in said interior building space, means whereby said air motive means and said fuel supply means are responsive to said thermostatic means to deliver air and fuel for combustion in said enclosed space when temperature is under a predetermined minimum in said interior building space, and means for control of said air motive means and said cooling water supply means to deliver said air and cooling water supply to said enclosed space when temperature in said building space is over a maximum predetermined temperature.

2. A heat transfer means for air conditioning of interior building space, comprising, an enclosed space in said means, a conduit means having surfaces exposed to said enclosed space and forming part of a heat conveying fluid system for heating or cooling of said interior building space, air motive means for supplying air to said enclosed space, fuel supply means delivering to said enclosed space, a cooling water supply delivering to said enclosed space and a water discharging means for said enclosed space for discharge of water from said enclosed space, thermostatic means exposed to air in said interior building space and means in connection therewith whereby said air motive means and said fuel supply means are responsive to said thermostatic means to deliver air and fuel for combustion in said enclosed space when temperature is under a predetermined minimum in said interior building space, and means for control of said cooling water supply to deliver said cooling water to said enclosed space for cooling of the exposed surfaces of said conduit means when temperature in said interior building space is over a maximum predetermined temperature.

3. A heat transfer means for air conditioning of interior building space, comprising, an enclosed space in said means, a conduit means having surfaces exposed to said enclosed space, and forming part of a heat conveying air conduit system for heating or cooling of said interior building space, combustion air motive means for supplying combustion air to said enclosed space, fuel supply means delivering to said enclosed space, a cooling water supply delivering to said enclosed space and a water discharge means for discharging water from said enclosed space, thermostatic means exposed to air in said interior building space and means in connection therewith whereby said combustion air motive means and said fuel supply means are responsive to said thermostatic means to deliver air and fuel for combustion in said enclosed space when temperature is under a predetermined minimum in said interior buildings space, and means for control of said cooling water supply to deliver said cooling water to said enclosed space for cooling of the exposed surfaces of said conduit means when temperature in said interior building space is over a predetermined maximum.

4. A heat transfer means for air conditioning of interior building space, comprising, an enclosed space in said means, a conduit means having surfaces exposed to said enclosed space and forming part of a heat conveying air conduit system for heating or cooling of said interior building space, combustion air motive means for supplying combustion air to said enclosed space, fuel supply means delivering to said enclosed space, a spray water motive means for spraying water in said enclosed space for deposit of a film of water on said surfaces of said conduit means, a water discharge for discharging water from said enclosed space, thermostatic means exposed to air in said interior building space and means in connection therewith whereby said combustion air motive means and said fuel supply means are responsive to said thermostatic means to deliver air and fuel for combustion in said enclosed space when temperature is under a predetermined minimum in said interior building space, and means for control of said spray water motive means and said combustion air motive means to deliver spraying water in said enclosed space and air through said enclosed space for evaporation of said spraying water in said enclosed space when temperature in said building interior space is over a maximum predetermined temperature.

5. A heat transfer means for air conditioning of interior building space, comprising, an enclosed space, a conduit means having surfaces exposed to said enclosed space and forming a part of a heat conveying fluid system for heating or cooling of said interior building space, air motive means for supplying air to said enclosed space, fuel supply means delivering to said enclosed space, a cooling water supply delivering to said enclosed space, thermostatic means exposed to air in said interior building space, means whereby said air motive means and said fuel supply means are responsive to said thermostatic means to deliver air and fuel for combustion in said enclosed space when temperature is under a predetermined minimum in said interior building space, and means for control of said air motive means and said cooling water supply means to deliver said air and cooling water supply to said enclosed space when temperature in said building space is over a maximum predetermined temperature, and means for exhausting combustion gases or vapor laden air from said enclosed space.

6. A heat transfer means for air conditioning of interior building space, comprising, an enclosed space in said means, a conduit means having surfaces exposed to said enclosed space and forming part of a heat conveying fluid system for heating or cooling of said interior building space, air motive means for supplying air to said enclosed space, fuel supply means delivering to said enclosed space, a cooling water supply delivering to said enclosed space and a water discharging means for said enclosed space for discharge of water from said enclosed space, thermostatic means exposed to air in said interior building space and means in connection therewith whereby said air motive means and said fuel supply means are responsive to said thermostatic means to deliver air and fuel for combustion in said enclosed space when temperature is under a predetermined minimum in said interior building space, and means for control of said cooling water supply to deliver said cooling water to said enclosed space for cooling of the exposed surfaces of said conduit means when temperature in said interior building space is over a maximum predetermined temperature, and means for exhausting combustion gases from said enclosed space.

7. A heat transfer means for air conditioning of interior building space, comprising, an enclosed space in said means, a conduit means having surfaces exposed to said enclosed space, and forming part of a heat conveying air conduit system for heating or cooling of said interior building space, combustion air motive means for supplying combustion air to said enclosed space, fuel supply means delivering to said enclosed space, a cooling water supply delivering to said enclosed space and a water discharge means for discharging water from said enclosed space, thermostatic means exposed to air in said interior building space and means in connection therewith whereby said combustion air motive means and said fuel supply means are responsive to said thermostatic means to deliver air and fuel for combustion in said enclosed space when temperature is under a predetermined minimum in said interior building space, and means for control of said cooling water supply to deliver said cooling water supply to said enclosed space for cooling of the exposed surfaces of said conduit means when temperature in said interior building space is over a predetermined maximum, and means for exhausting combustion gases from said enclosed space.

8. A heat transfer means for air conditioning of interior building space, comprising, an enclosed space in said means, a conduit means having surfaces exposed to said enclosed space and forming part of a heat conveying fluid conduit system for heating or cooling of said interior building space, combustion air motive means for supplying air for combustion to said enclosed space, fuel supply means delivering to said enclosed space, a spray water motive means for spraying water to said enclosed space for deposit of a film of water on said surfaces of said conduit means, a water discharge for discharging water from said enclosed space, thermostatic means exposed to air in said interior building space and means in connection therewith whereby said combustion air motive means and said fuel supply means are responsive to said thermostatic means to deliver air and fuel for combustion in said enclosed space when temperature is under a predetermined minimum in said interior building space, and means for control of said spray water motive means and said combustion air motive means to deliver spraying water in said enclosed space and air through said enclosed space for evaporation of said spraying water in said enclosed space when temperature in said building interior space is over a maximum predetermined temperature, and means for exhausting combustion gases or vapor laden air from said enclosed space.

9. A fluid conditioning system for building interior conditioning comprising, a conditioning unit having a heat conveying fluid space and a heat supply or absorption space adjacent said first named space, means for passing heat conveying fluid to and from said heat conveying fluid space, said first named space having heat transfer surfaces exposed to said second named space, a means for entry of air to said second named space and a means for discharge of gases or vapor laden air from said second named space, and a motor operated blower means for moving air through said means for entry and to said second named space, a means for delivery of fuel for combustion with air in said second named space, a spray water pumping means discharging through a spray means into said second named space, and a thermostatic control means and dual control circuits associated therewith, one of said control circuits being in association with said motor operated blower means and said means for delivery of fuel to procure combustion in said second named space when temperature of air in space to which said thermostatic control means is subject is under a predetermined minimum, the other of said control circuits being in association with said motor operated blower means and said spray water pumping means to procure discharge of said spray water in said second named space and movement of air for water evaporation through said second named space when temperature of air in space to which said thermostatic control means is subject is over a predetermined maximum temperature.

10. A heat transfer means for air conditioning of interior building air, comprising, a heat transfer unit having a heat conveying fluid space and a heat supply or absorption space adjacent said first named space, means for passing heat conveying fluid as air or liquid to or from said heat conveying fluid space, said first named space having heat transfer surfaces exposed to said second named space, a means for entry of air to said second named space and a means for discharge of gases or vapor laden air from said second named space and a motor operated blower means for moving air through said means for entry and to said second named space, a means for delivery of fuel for combustion with air in said second named space, a spray water pumping means discharging through a spray means into said second named space; an electric circuit in association with said motor operated blower means and said means for delivery of fuel to procure combustion in said second named space; an electric circuit associated with said motor operated blower means and said spray water pumping means to procure discharge of said spray water in said second named space and movement of air for water evaporation through said second named space; a thermostatic control means located in said interior building air and a switching means subversive thereto to procure closing of said first named circuit and the operation stated therewith when temperature in said interior building air is under a predetermined minimum and to procure closing of said second circuit and the operation stated therewith when temperature in said interior building air is over a predetermined maximum.

11. All the means stated and included in claim 9 and in combination therewith a manual control means for said circuits to make either of said circuits operative and the other inoperative.

12. All the means stated and included in claim 10 and in combination therewith a manual control means for said circuits to make either of said circuits operative and the other inoperative.

13. A heat transfer means for air conditioning of interior building air comprising, a heat transfer unit having a heat conveying fluid space and a heat supply or absorption space adjacent said first named space, means for passing heat conveying fluid as air or liquid to or from said heat conveying fluid space, said first named space having heat transfer surfaces exposed to said second named space, a means for entry of air to said second named space and a means for discharge of gases or vapor laden air from said second named space and a motor operated blower means for moving air through said means for entry and to said second named space, a means for delivery of fuel for combustion with air in said second named space, a spray water pumping means discharging through a spray means into said second named space; an electric circuit in association with said motor operated blower means and said means for delivery of fuel to procure combustion in said second named space; an electric circuit associated with said motor operated blower means and said spray water pumping means to procure discharge of said spray water in said second named space and movement of air for water evaporation through said second named space; a means for discharge of water from said second named space; a thermostatic control means located in said interior building air and a switching means subversive thereto to procure closing of said first named circuit and the operation stated therewith when temperature in said building interior air is under a predetermined minimum and to procure closing of said second circuit and the operation stated therewith when temperature in said interior building air is over a predetermined maximum, and a manual control means for said circuits to make either of said circuits operative and the other inoperative.

ADOLPHE C. PETERSON.

REFERENCES CITED

The following references are of record in the file of this patent:

UNITED STATES PATENTS

| Number | Name | Date |
|---|---|---|
| 762,591 | Lawrence | June 14, 1904 |
| 1,280,071 | Musser | Sept. 24, 1918 |
| 1,409,520 | Bird | Mar. 14, 1922 |
| 1,721,589 | Donaldson | July 23, 1929 |
| 1,862,707 | Rifenberick | June 14, 1932 |
| 1,886,403 | Jones | Nov. 8, 1932 |
| 2,011,787 | Whiteley | Aug. 20, 1935 |
| 2,090,782 | Carraway | Aug. 24, 1937 |
| 2,200,442 | Crawford | May 14, 1940 |
| 2,204,012 | Cook | June 11, 1940 |
| 2,228,484 | Ramsaur et al. | Jan. 14, 1941 |
| 2,294,579 | Sherman | Sept. 1, 1942 |